US006862682B2

(12) United States Patent
Louden et al.

(10) Patent No.: US 6,862,682 B2
(45) Date of Patent: *Mar. 1, 2005

(54) METHOD AND APPARATUS FOR MAKING AND USING WIRELESS TEST VERBS

(75) Inventors: Michael Louden, Mound, MN (US); Francois Charette, Minneapolis, MN (US); Ryon Boen, Chanhassen, MN (US); Mitch Krause, Chanhassen, MN (US)

(73) Assignee: TestQuest, Inc., Chanhassen, MN (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/323,595

(22) Filed: Dec. 18, 2002

(65) Prior Publication Data

US 2003/0208712 A1 Nov. 6, 2003

Related U.S. Application Data

(60) Provisional application No. 60/377,515, filed on May 1, 2002.

(51) Int. Cl.[7] .............................................. G06F 15/16
(52) U.S. Cl. ............................. 713/2; 717/124; 714/33; 714/38; 714/738; 714/742; 709/205
(58) Field of Search ............................ 713/2; 717/124; 714/33, 38, 738, 742; 709/205

(56) References Cited

U.S. PATENT DOCUMENTS

| 5,740,352 | A | | 4/1998 | Philipp et al. ................. 714/40 |
| 5,901,315 | A | * | 5/1999 | Edwards et al. ............. 717/124 |
| 6,154,876 | A | * | 11/2000 | Haley et al. ................. 717/133 |
| 6,226,784 | B1 | * | 5/2001 | Holmes et al. .............. 717/100 |
| 6,243,862 | B1 | * | 6/2001 | Lebow ........................ 717/131 |
| 6,311,327 | B1 | * | 10/2001 | O'Brien et al. .............. 717/114 |
| 6,405,149 | B1 | * | 6/2002 | Tsai et al. ................... 702/119 |
| 6,449,744 | B1 | * | 9/2002 | Hansen ........................ 714/738 |
| 6,539,539 | B1 | * | 3/2003 | Larsen et al. ................ 717/124 |
| 2003/0065981 | A1 | * | 4/2003 | Jones et al. .................... 714/38 |

* cited by examiner

Primary Examiner—A. Elamin
(74) Attorney, Agent, or Firm—Schwegman, Lundberg, Woessner & Kluth, P.A.

(57) ABSTRACT

A computerized method and system for testing a function of an information-processing system. This includes providing an architecture having a set of test commands, the test commands including a set of one or more stimulation commands and a set of one or more result-testing commands, and defining a set of test verbs out of combinations of the test commands. This allows the test programmer to define an overall test program that uses the test verbs in writing a test program that specifies an overall function that will extensively test a system-under-test. The methods further includes executing a program that includes a plurality of test verb instructions and outputting a result of the program. In some embodiments, the present invention provides a computer-readable media that includes instructions coded thereon that when executed on a suitably programmed computer executes one or more of the above methods.

33 Claims, 8 Drawing Sheets

FIG. 6

608 ~ TVT_INFRASTRUCTURE

| | 610 | 620 | 630 | 640 | 650 | 660 | 670 | 680 | 690 |
|---|---|---|---|---|---|---|---|---|---|
| 602 → | SCREEN | OBJECT NAME | TEST ENGLISH | TEST FRENCH | FONT | NORMAL BMP | NORMAL TEXT COLOR | FOCUS BMP | FOCUS TEXT COLOR |
| 606 → | MAIN | ICO_ADAPTER | ADAPTERS | CONNECTIONS | ARIAL 12PT | ADAPT BMP | BLACK | ADAPT FOCUS BMP | WHITE |
| | 612 | 622 | 632 | 642 | 652 | 662 | 672 | 682 | 692 |
| | • | • | • | • | • | • | • | • | • |
| | • | • | • | • | • | • | • | • | • |

604 ⎫ (spanning NORMAL BMP, NORMAL TEXT COLOR, FOCUS BMP, FOCUS TEXT COLOR)

708 ~ TVT_TRANSLATION

| | 710 | 720 | 730 | 740 |
|---|---|---|---|---|
| 702 → | ENGLISH | FRENCH | SPANISH | GERMAN |
| 706 → | FILE | DOSSIER | ARCHIVO | AKTE |
| | EXIT | SORTIE | SALIDA | AUSGANG |
| | HELP | AIDE | AYUDA | HILFE |
| | 712 | 722 | 732 | 742 |
| | • | • | • | • |
| | • | • | • | • |
| | • | • | • | • |
| | TOOLS | OUTILS | HERRAMENTAS | WERKZEUGE |

704 ⎫ (spanning FRENCH, SPANISH, GERMAN)

730

METHOD AND APPARATUS FOR MAKING AND USING WIRELESS TEST VERBS

RELATED APPLICATION

This application claims priority to U.S. Provisional Application Ser. No. 60/377,515 (entitled AUTOMATIC TESTING APPARATUS AND METHOD, filed May 1, 2002) which is herein incorporated by reference.

This application is related to U.S. Patent Application entitled METHOD AND APPARATUS FOR MAKING AND USING TEST VERBS filed on even date herewith, to U.S. Patent Application entitled NON-INTRUSIVE TESTING SYSTEM AND METHOD filed on even date herewith, and to U.S. Patent Application entitled SOFTWARE TEST AGENTS filed on even date herewith, each of which are incorporated in their entirety by reference.

FIELD OF THE INVENTION

This invention relates to the field of computerized test systems and more specifically to a method and apparatus of making and using wireless test verbs out of combinations of simpler test commands.

BACKGROUND OF THE INVENTION

Wireless information-processing devices are tested several times over the course of their life cycle, starting with their initial design and being repeated every time the product is modified. Typical wireless information-processing devices include wireless personal data assistants (PDAs), wireless phones, wireless point-of-sale devices, pagers, and wireless networked computing devices. Because products today commonly go through a sizable number of revisions and because testing typically becomes more sophisticated over time, this task becomes a larger and larger proposition. Additionally, the testing of such wireless information-processing devices is becoming more complex and time consuming because a wireless information-processing device may run on many different platforms with many different configurations in many different languages. Because of this, the testing requirements in today's wireless information-processing device development environment continue to grow exponentially.

For most organizations, testing is conducted by a test engineer who identifies defects by manually running the product through a defined series of steps and observing the result after each step. Because the series of steps is intended to both thoroughly exercise product functions as well as reexecute scenarios that have identified problems in the past, the testing process can be rather lengthy and time-consuming. Add on the multiplicity of tests that must be executed due to device size, platform and configuration requirements, and language requirements, testing has become a time consuming and extremely expensive process.

In today's economy, manufacturers of technology solutions are facing new competitive pressures that are forcing them to change the way they bring products to market. Now, being first-to-market with the latest technology is more important than ever before. But customers require that defects be uncovered and corrected before new products get to market. Additionally, there is pressure to improve profitability by cutting costs anywhere possible.

Product testing has become the focal point where these conflicting demands collide. Manual testing procedures, long viewed as the only way to uncover product defects, effectively delay delivery of new products to the market, and the expense involved puts tremendous pressure on profitability margins. Additionally, by their nature, manual testing procedures often fail to uncover all defects.

Automated testing of information-processing device products has begun replacing manual testing procedures. The benefits of test automation include reduced test personnel costs, better test coverage, and quicker time to market. However, an effective automated testing product often cannot be implemented. The most common reason for failure is the cost of creating and maintaining automated testing code. Additionally, the available automated testing products are typically are a one size fits all type of product that is not tailored to one specific type of device.

The creation of test automation scripts requires a considerable amount of time and resources. The reusability of these scripts is necessary to fully realize the benefits of a test automation product. Customizing a one size fits all product to a specific type of device also requires a considerable amount of time and resources. However, when, for example, a user interface is changed or a system is implemented on a new device platform, with today's automated testing tools, all test scripts for the user interface or a specific device may need to be rewritten. Additionally, if an information-processing system operates on multiple hardware or operating-system variants, each platform requires its own test script. Further, if a system-under-test is developed in multiple languages, automated test scripts need to be created for each language.

What is lacking in the prior art are automated testing systems and methods that allow for the reusability of automated test scripts taking into account multiple platforms, languages, and cosmetic changes to the system-under-test. The prior art is also lacking an automated testing system and method that meets the reusability deficiency that is also tailored to meet the automated testing needs of the wireless information-process device manufacturing and development community.

What is needed is an automated testing system and method that is reusable across wireless platforms, handles multiple languages, and allows cosmetic changes to a wireless information-processing system-under-test. Further, the automated testing system and method must reduce test personnel costs, provide better test coverage, reduce time to market, and decrease the creation and maintenance costs of automated test scripts.

SUMMARY OF THE INVENTION

The present invention provides a computerized method for testing a function of a wireless information-processing system. This method includes providing an architecture having a set of low-level test commands, the test commands including a set of one or more stimulation commands and a set of one or more result-testing commands, and defining a set of wireless test verbs out of combinations of the low-level test commands. This allows the test programmer to define an overall test program that uses the wireless test verbs in writing a test program that specifies an overall function that will extensively test a system-under-test. The method further includes executing a program that includes a plurality of test verb instructions and outputting a result of the program.

Another aspect of the present invention provides a computer-readable media that includes instructions coded thereon that when executed on a suitably programmed computer executes one or more of the above methods.

Yet another aspect of the present invention provides a computerized system for testing a function of a wireless information-processing system. The system includes a memory, a set of test commands stored in the memory, wherein each one of the test commands includes a set of one or more stimulation commands and a set of one or more result-testing commands. The system also includes a wireless test verb instruction set program stored in the memory that defines a set of test verbs out of combinations of the test commands. A programmer then generates a test program stored in the memory that includes a plurality of wireless test verb instructions. Some embodiments further include an output port that drives stimulation signals based on the execution of the test program, an input port that receives result signals based on behavior of a system-under-test, and an output device that presents a result of the test program.

BRIEF DESCRIPTION OF THE DRAWINGS

FIG. 6 is a database table diagram according to the invention.

FIG. 7 is a database table diagram according to the invention.

DETAILED DESCRIPTION OF THE INVENTION

In the following detailed description of the invention, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Apparatus for Making and Using Test Verbs

Conventional automated testing systems typically require the creation of different code for testing each different hardware and operating-system platform on which a system-under-test may be executed. Further, if the system-under-test is developed in multiple languages, code must be created for each language to ensure complete testing coverage. In contrast, the present invention allows for the creation of reusable code for testing a system that is deployable on one or more platforms in one or more languages.

Figure 1:
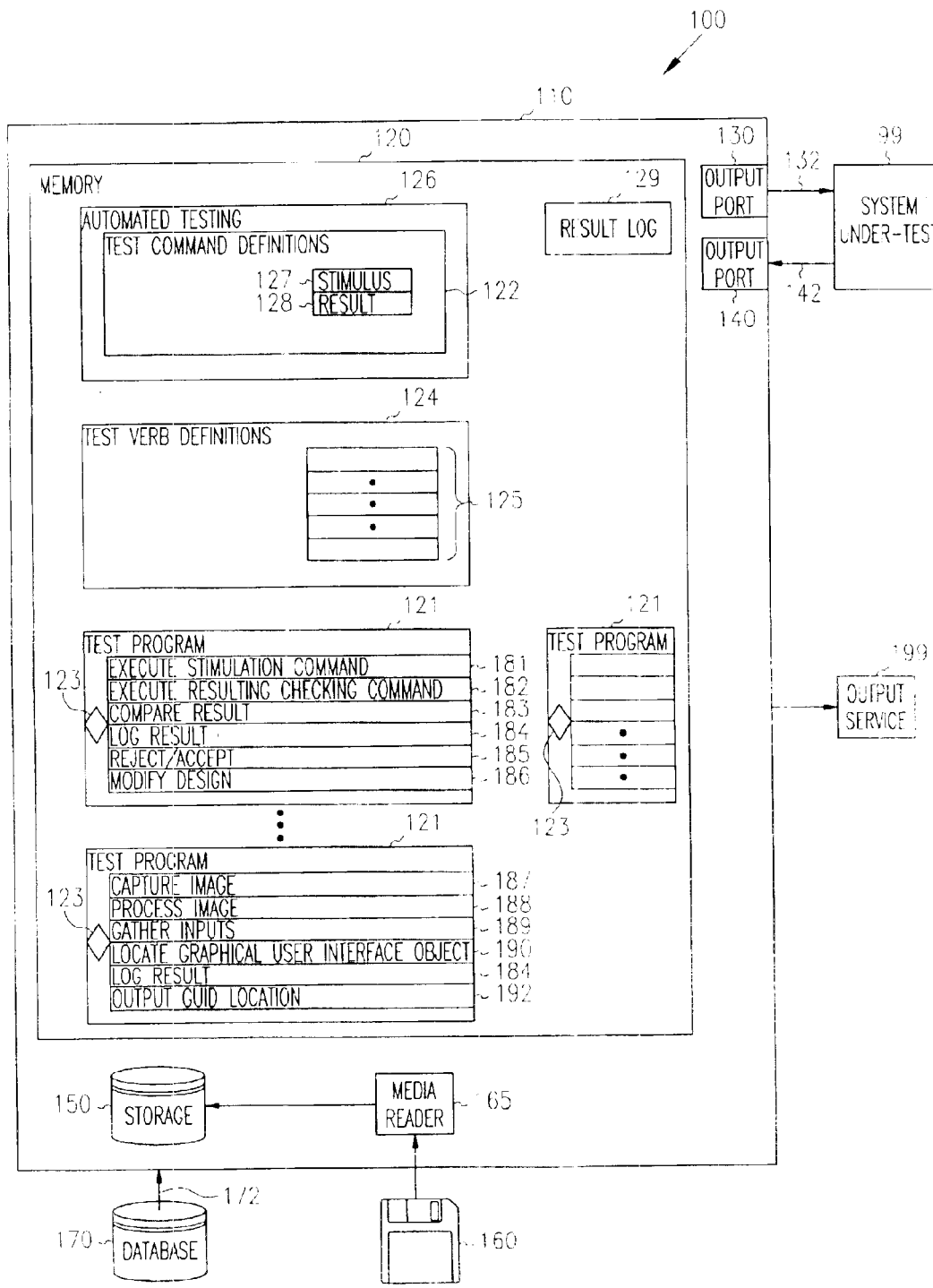
FIG. 1 shows a system 100 according to the invention.

FIG. 1 shows a system 100, according to the present invention, for automated testing of an information-processing system 99. In various embodiments, information-processing system 99 includes a device controlled by an internal microprocessor or other digital circuit, such as a handheld computing device (e.g., a personal data assistant or "PDA"), a cellular phone, an interactive television system, a personal computer, an enterprise-class computing system such as a mainframe computer, a medical device such as a cardiac monitor, or a household appliance having a "smart" controller.

In some embodiments, system 100 includes a testing host device 110 having a memory 120 storing a test program 121, a set of test commands 122, test verb definitions 124, an automated testing tool 126, and a result log 129. Within test program 121 is a comparator 123 that compares the result signals returned from a system-under-test with the expected results for the test. The comparator 123 generates a test result based on this comparison. In some embodiments, system 100 includes a database 170 coupled to system 110 by connector 172.

In various embodiments, database 170 includes a relational database management system, a hierarchical database management system, or a document management system. In various embodiments, connector 172 includes a wired local area network (LAN) connection, a wireless LAN connection, or a wide area network connection (WAN).

In some embodiments, testing host device 110 also includes a storage 150, an output port 130, and an input port 140. In some embodiments, system 100 also includes a removable media 160 and a media reader 165 used in testing host device 110.

Each test verb definition 125 is an encapsulated macro that a test verb programmer creates to perform a specific task. The set of test verb definitions 124 are created in the test-command syntax required by test program 126. Each test verb definition 125 includes one or more test commands 122. In some embodiments, test program 126 is an automated testing tool, such as TestQuest Pro™ (available from TestQuest Inc. of Chanhassen, Minn.), for testing information-processing 99 systems. One such system is described in U.S. Pat. No. 5,740,352 to Philipp et al. Test verbs 124 are then included in a predetermined order in a test program 121 for testing a system-under-test 99.

In some embodiments, a test verb 125, stored in memory 120, is used for determining whether to reject a manufactured part based on analysis of test results from system-under-test 99. In some embodiments, the test verb 125 used for determining whether to reject a manufactured part requires the input of an acceptable variation tolerance for the test performed.

An example embodiment of a test program 121 implementing the test verb 125 used for determining whether to reject a manufactured part 99 includes test verbs performing multiple tasks. These tasks include testing the manufactured part 99 by executing 181 a stimulation command 127, executing 182 a result-checking command 128, comparing 183 the test result with the acceptable variation tolerance with comparator 123 to determine 185 whether to reject the manufactured part 99, and logging 184 the result in result log 129. In various embodiments, acceptable variation tolerances for manufactured parts are stored in a location such as memory 120, database 170, storage 150, and removable media 160.

In some embodiments, a test verb 125, stored in memory 120, is used for determining the location of a graphical user interface object displayed on a display of a system-under-test 99. In some embodiments, test verb 125 used for determining the location of a graphical user interface object requires the input of a bitmap file and indicators specifying a region of the graphical user interface to search for the graphical user interface object. In some embodiments, test verb 125 used for determining the location of a graphical user interface object returns a boolean value signifying whether the graphical user interface object exists on the graphical user interface. In another embodiment, test verb 125 used for determining the location of a graphical user interface object returns the location on the graphical user interface of the graphical user interface object and the selected status of the graphical user interface object (e.g., selected or not selected). In various embodiments, graphical user interface objects to be located are stored in locations including memory 120, database 170, storage 150, and removable media 160.

In one embodiment of a test program 121, a test verb 125 used for determining the location of a graphical user interface object is defined narrowly to leverage test verbs 125 created for more common testing tasks (e.g., log result 184). In one such embodiment, a test program is created to perform a testing task that requires the determination of the location of a graphical user interface object. In this embodiment, test verbs 125 are used to capture 187 the image displayed on a graphical user interface of a system-under-test 99, process 188 the captured image to create a bitmap file (BMP), gather 189 inputs for other test verbs 125 (e.g., the graphical user interface object to be located, a region to search for the graphical user interface object, . . . ), locate 190 the graphical user interface object, log 184 the result, and output 191 the location of the graphical user interface object either to the next test verb 192 in a test program 121 or to an output device 199 of a system 100.

In some embodiments, a test verb 125, stored in memory 120, is used for comparing an audio output from system-under-test 99 with an expected output. In various embodiments, the expected audio output is an audio file stored in storage 150, database 170, or removable media 160. In some embodiments, test verb 125 requires the input of an expected audio output file and the audio output of system-under-test 99. In some embodiments, the test verb 125 used for comparing an audio output of system-under-test 99 with an expected audio output returns a boolean indication of a match between the expected and actual audio outputs.

In one embodiment, testing host device 110 is used to test an information-processing system 99 that is external to testing host device 110. In such an embodiment, system-under-test 99 is coupled to output port 130 via connector 132 and input port 140 via connector 142. Test program 121 is then run on test host device 110. The test command definitions 122 send stimulus commands 127 and provide result-checking commands 128 to check for test failure on system-under-test 99. In one embodiment, upon completion of a test, an entry is made in result log 129. In another embodiment, upon completion of a test, the results are sent to output device 199. In some embodiments, output device 199 includes a CRT monitor, a printer, or an audio-output device such as a sound card. In some embodiments, upon completion of a test, the results are sent to an output device 199 and/or to the log file 129.

In various embodiments, connectors 132 and 142 include VGA or S-video cables. In other embodiments, connectors 132 and 142 include coaxial, serial, category 5, universal serial bus (USB), or custom cables specific for a certain system-under-test 199.

In one embodiment, result log 129 is an ASCII text file. In another embodiment, result log 129 is an extensible markup language (XML) file that facilitates entry of the log data into a database by providing various identification or categorization tags on each result. In some embodiments, log file 129 is created in memory 120, but in other embodiments log file 129 is stored in storage 150 or on removable media 160. In some embodiments, result log 129 is stored in database 170.

Figure 4:
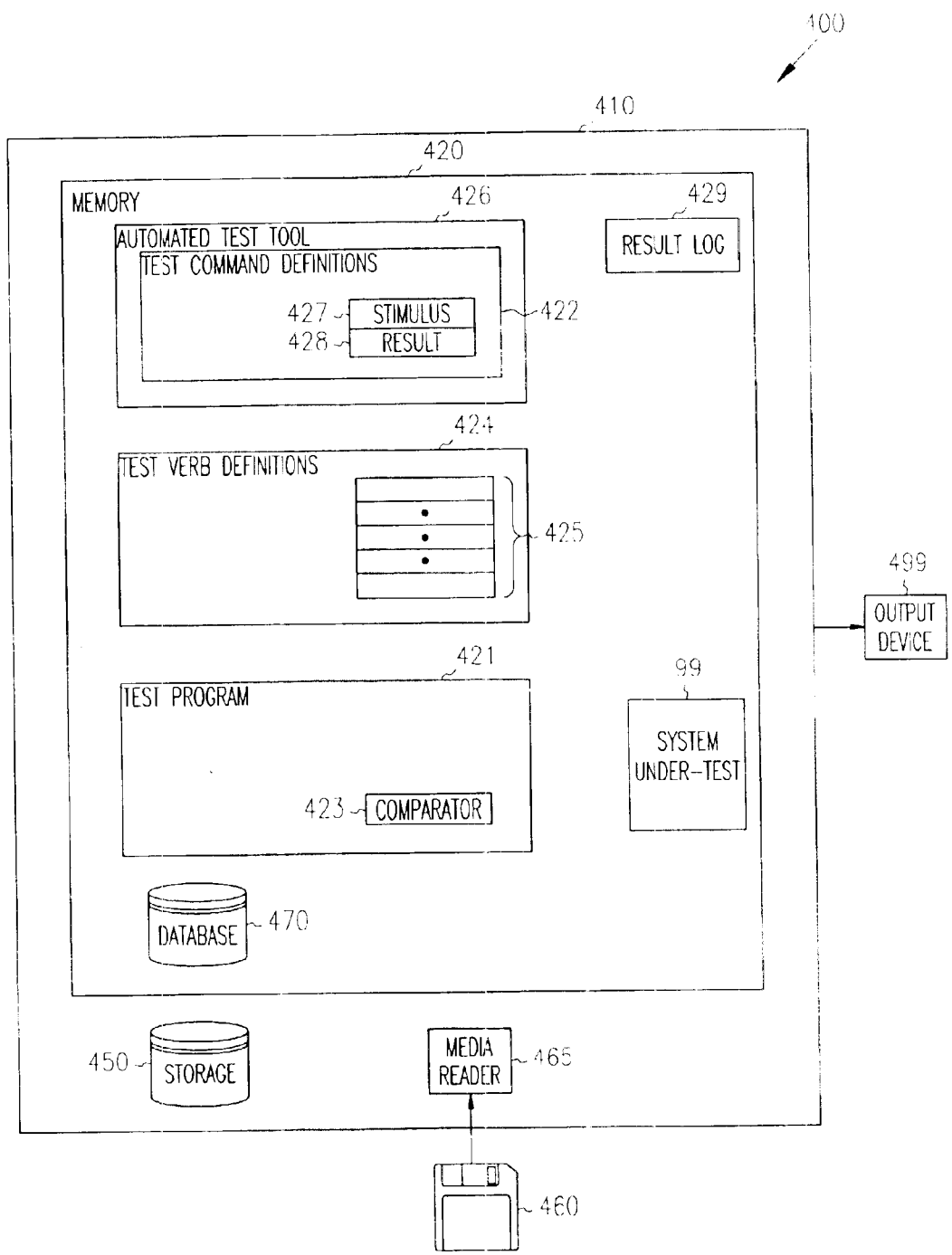
FIG. 4 shows a system 400 according to the invention.

In another embodiment, shown in FIG. 4, testing host device 410 is used to test an information-processing system 99 that is internal to testing host device 410. In such an embodiment, system-under-test 99 is stored in memory 420 and executed on testing host device 410. All relevant input operations to, and output operations from, system-under-test 99 are handled within testing host device 410. In some embodiments, testing host device 410 holds a database 470 in memory.

Method for Making and Using Test Verbs

Figure 2:
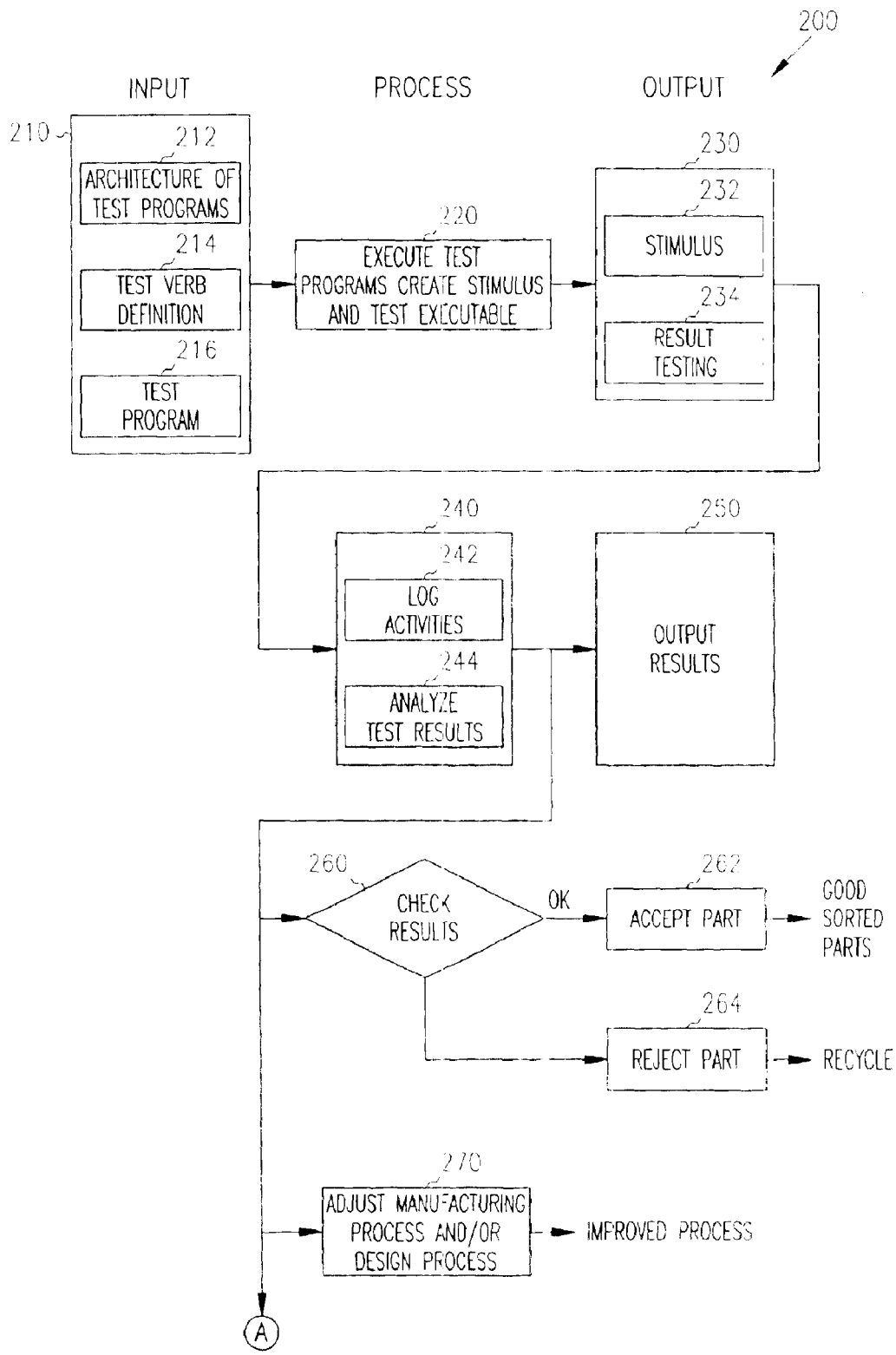
FIG. 2 is a flow diagram of a method 200 according to the invention.

As shown in FIG. 2, one aspect of the present invention provides a computerized method 200 for testing functions of an information-processing system. Method 200 includes providing 212 an architecture having a set of test commands, the test commands including a set of one or more stimulation commands 232 and a set of one or more result-testing commands 234, and defining 214 a set of test verbs out of combinations of the test commands 212. This allows the test programmer to define an overall test program 216 that uses the test verbs 214 in writing a test program 216 that specifies an overall function that will extensively test an information-processing system. The methods further include executing 220 a program that includes one or more test verb instructions 214 and outputting 250 a result of the program.

In some embodiments, computerized method 200 is implemented by coding instructions on a computer-readable media 160 (see FIG. 1) that when executed on a testing host device, executes computerized method 200.

In some embodiments, the executing program further includes logging 242 results of the program execution. In some embodiments, logging 242 of activities and results is performed in an ASCII text file. In another embodiment, logging 242 of activities and results is performed in an extensible markup language file that facilitates entry of log data into a database by providing various identification and categorization tags on each result.

In some embodiments, the method 200 further includes accepting 262 or rejecting 264 a manufactured part as a result of analyzing 244 results of the execution of the test program. In some embodiments, in order to determine whether to accept or reject a manufactured part, the test verb definitions 214 and test program 216 are created with acceptable tolerances, or access to acceptable tolerances, for the quality or performance of the manufactured part. In some embodiments, the test program 216 is executed 220 by stimulating 232 the manufactured part, testing 234 the result of the stimulus 232, analyzing 244 the result by checking 260 the result against acceptable tolerances to determine whether to accept 262 the part or to reject 264 it. In some embodiments, test program 214 can make adjustments 270 to the manufacturing process used to make the product and/or to the design of the product itself.

Figure 3:
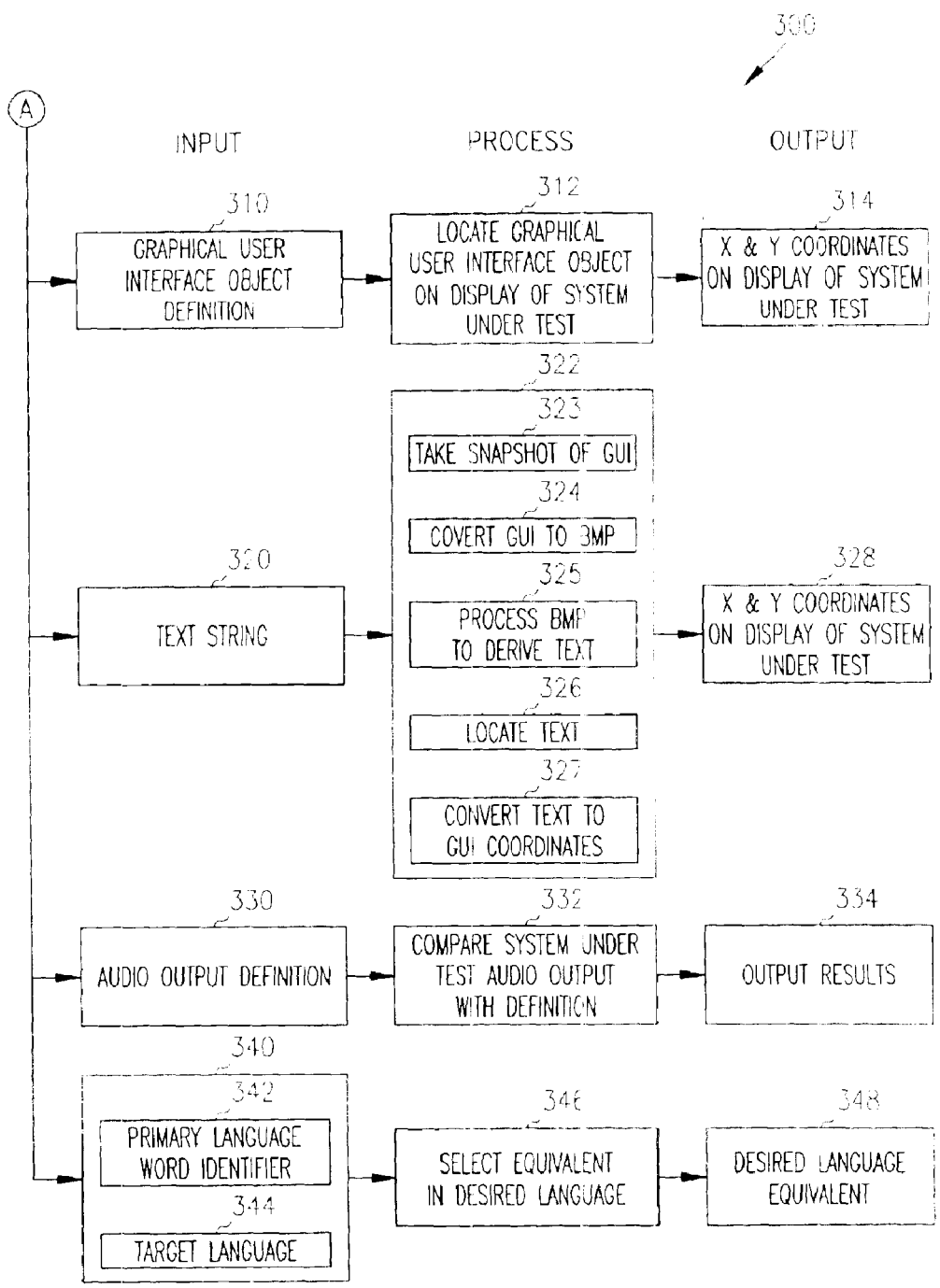
FIG. 3 is a flow diagram of a method 300 according to the invention.

The computerized method 200 of FIG. 2 for testing functions of an information-processing system is continued on FIG. 3 as method 300.

In some embodiments, method 300 includes a process for locating 312 a graphical user interface object on the display of a system-under-test. In some embodiments, locating 312 a graphical user interface object is accomplished by providing test program 216 a graphical user interface object definition 310 which is used to compare against objects found on the graphical user interface until a match is found. In various embodiments, a graphical user interface object definition 310 includes information that enables an information-processing system implementing method 300 to locate a graphical user interface object such as the coordinates corresponding to a region of the graphical user interface to search, a bitmap file, or a color. In various embodiments, the output 314 of the process for locating 312 a graphical user interface object returns varying types of information about the graphical user interface object such as coordinates specifying the location of the graphical user interface object, a boolean result specifying whether the graphical user interface object exists, or a status of the graphical user interface object such as whether or not the graphical user interface object is currently selected.

Figure 9:
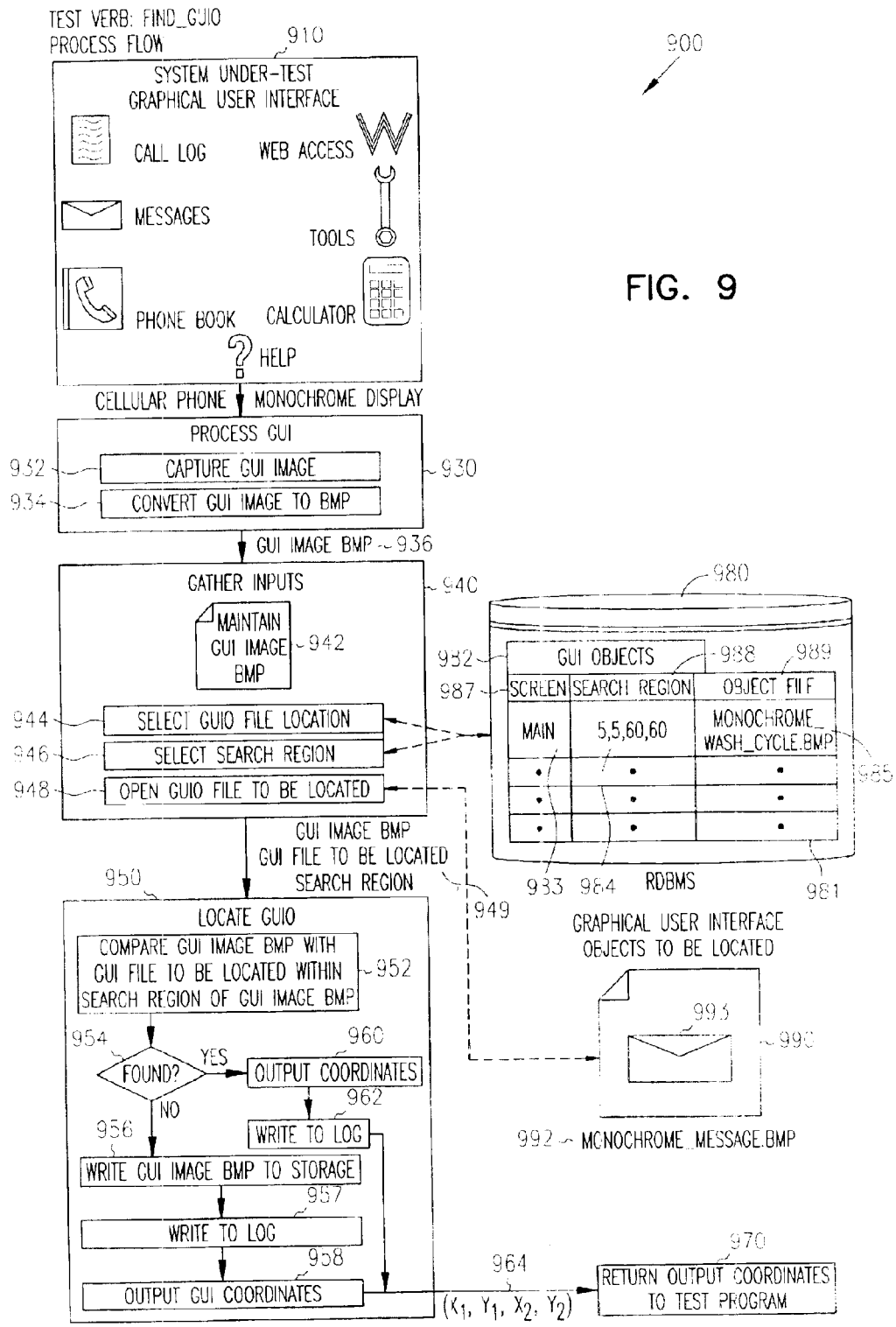
FIG. 9 shows the flow of a method 900 for locating a graphical user interface object on the display of a system-under-test according to the invention.

Another embodiment of the process for locating 312 a graphical user interface object on the display of a system-under-test is shown in FIG. 9 This embodiment includes the steps of processing 930 a captured image of a cellular phone graphical user interface 910, gathering 940 inputs for further processing, locating 950 the graphical user interface object to be located 993, and returning 970 the location of the graphical user interface object 993.

The step of processing 930 the captured image of a cellular phone graphical user interface 910 includes capturing 932 a graphical user interface image 910 from the system-under-test and converting 934 the image to a bitmap file (BMP). The bitmap file of the graphical user interface is then passed 936 to the gathering inputs step 940.

The gathering inputs step 940 includes maintaining 942 an instance of the bitmap file of the graphical user interface, selecting 944 the graphical user interface object to be located file 990 location 985 from a table 981 within a relational database management system 980, selecting 946 the region to search 984 within the bitmap file of the graphical user interface from the relational database management system 980, and opening 948 the file 990 containing the graphical user interface object to be located 993. The table 981, named "GUI Objects" 982 within the relational database management system 980 includes columns screen 987, search region 988, and object file 989 and data (983 984, and 985) under those columns representative of a screen 983 with a search region 984 where an object file 985 can be located. A reference to the instance of the bitmap file of the graphical user interface 910, a reference to the open file 990 of the graphical user interface object 993 to be located, and the region to search 984 for the graphical user interface object 993 on the image of the graphical user interface of the system-under-test are then passed 949 to the step for locating 950 the graphical user interface object 993.

Step 950 for locating the graphical user interface object 993 includes comparing 952 the graphical user interface image of the system-under-test with the file 990 of the graphical user interface object 993 to be located in order to find matches. If the graphical user interface object 993 is located, the step 950 outputs 960 the coordinates 964 of the graphical user interface object 993 within the graphical user interface 910 of the system-under-test and writes 962 a success message to a log. If the graphical user interface object 993 is not located, the step 950 writes 956 the graphical user interface image 910 file of the system-under-test to storage, writes 957 a failure message to the log including the location of the graphical user interface image 910 file of the system-under-test in storage, and outputs 958 null values for the location of the graphical user interface object 993.

Further embodiments of method 300 include a process for locating 322 text strings 320 on a graphical user interface. In some embodiments, the process of locating 322 text strings 320 on a graphical user interface includes taking 323 a snapshot of the graphical user interface and creating 324 a bitmap, processing 325 the bitmap image to derive text, locating 326 the text input 320 to the process 322, and converting 327 the text location back to graphical user interface coordinates. In various embodiments, the output 328 of the process 322 of locating text strings 320 on a graphical user interface returns varying types of information about the text string 320 such as the font, the font size, the coordinates specifying the location of the text 320 on the graphical user interface, the color of the text 320, the number of times the text 320 was located on the graphical user interface, or a boolean result indicating whether the text 320 was located on the graphical user interface.

In some embodiments, method 300 includes a process 332 for comparing an expected audio output definition 330 with the output of a system-under-test. In various embodiments, the input 330 to the process 332 for comparing an expected audio output definition 330 with the actual output of a system-under-test includes information such as frequency, wave pattern, volume, or duration of the sound. In some embodiments, the output 334 of process 332 includes information about the audio output from the system-under-test. In one such embodiment, the output 334 of process 332 is a boolean value indicating whether process 332 made a match between the expected audio output 330 with the system-under-test audio output.

In some embodiments, method 300 includes a process for translating 346 a primary language input 342 to a target language 344 output 348. Translation process 346 is used when a system-under-test requires testing in multiple languages. In some embodiments, the translation process 346 requires inputs 340. In some embodiments, inputs 340 include a primary language word identifier 342 and a target language 344. In some embodiments, translation process 346 uses the primary language identifier 342 input and the target language 344 to select 346 the desired language equivalent 348 from a relational database management system table.

In some embodiments, translation process 346 operates using a relational database management system to store the primary language 342 and target language equivalents 348. In some embodiments, as shown is FIG. 6, database table 600 named "tvt_infrastructure" 608 includes columns 602 and rows 604. In this embodiment, there are columns text_english 630 and text_french 640 that in row 606 hold the values of "Adapters" 632 as the English word and "Connections" 642 as the French equivalent. Table 600 operates for the translation process 346 by selecting 346 a row 604 based on specific values in columns 602 including the value in column text_english 630. In one such embodiment, an example of a structured query language (SQL) statement used to select 346 a target language equivalent 348 of a primary language text string 342 in a typical relational database management system is:

```
SELECT text_french
     FROM tvt_infrastructure
     WHERE screen = "MAIN" AND
         objectname = "ICO_ADAPTOR" AND
         text_english = "Adapters";
```

Such a SQL statement will return a value of "Connections" 642 as the French translation of the English text string "Adapters" 632. This embodiment uses database table 600 that also includes other types of information in a row 604 for other purposes. However, as shown in FIG. 7, another embodiment for translating 346 a primary language text string 342 into a target language equivalent 348 uses a table 700 that is for language translation 346 purposes only.

In other embodiments, translation process 346 operates using a relational database management system to store the primary language 342 and target language equivalents 348. As shown in FIG. 7, database table 700, named tvt_translation 708, has columns 702 named English 710, French 720, Spanish 730, and German 740 and rows 704 holding text strings of equivalent meaning in the language of their respective columns. In one such embodiment, an example of a structured query language (SQL) statement used to select 346 a target language equivalent 348 of a primary language text string 342 in a typical relational database management system is:

```
SELECT german
     FROM tvt_infrastructure
     WHERE spanish = "Archivo";
```

Such a SQL statement will return a value of "Akte" 742 as the German translation 346 of the Spanish text string "Archivo" 732.

In one such embodiment, the system-under-test is a washing machine, developed with English as the primary language. However, the washing machine must also be able to display text on its LCD display in French and Spanish. In such embodiments, when a process is encountered that requires testing of graphical user interface text displayed on the LCD, any text strings that are displayed in English when the washing machine is operating in its primary language are sent to process 346 for translation into the target language 344 of French or Spanish.

Figure 5:
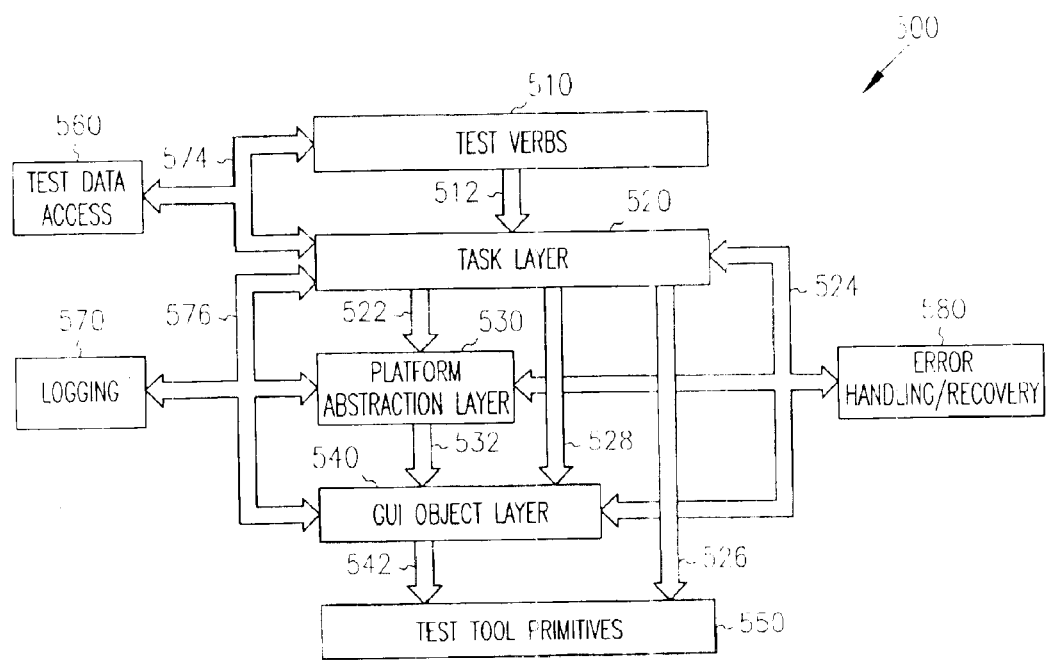
FIG. 5 is a diagram of an architecture according to the invention.

In some embodiments, underlying a system for automated testing of an information-processing system is a flexible, layered architecture 500, as shown in FIG. 5, that allows such a system to operate on many different devices and operating-system platforms and in many different languages. In some embodiments, the flexible, layered architecture 500 includes a test verb layer 510, a task layer 520, a platform abstraction layer 530, a graphical user interface object layer 540, and a test tool primitive layer 550.

In some embodiments, test verb layer 510 includes the semantic content of the test verbs that define a test vocabulary. In some embodiments, task layer 520 includes test verbs instantiated in memory that are available to an automated test program during execution. In some embodiments, the platform abstraction layer 530 handles test verb command handling differences when test verbs are executed or performed on different platforms that have different execution, processing, stimulation, or language requirements. In some embodiments, graphical user interface layer 540 handles graphical user interface object differences between systems-under-test such as color display, monochrome display, display size, display resolution, or language. In some embodiments, the test tool primitive layer 550 includes the application programming interface (API) of the test tool used along with a test verb implementation such as the HLF application programming interface available within TestQuest Pro.

In some embodiments, the flexible, layered architecture 500 allows communication between the infrastructure layers and with additional ancillary components of the computerized system embodied in FIG. 1. In some embodiments, test verb layer 510 includes semantic content that accesses test data 514 that becomes instantiated in memory in task layer 520. In some embodiments, task layer 520 communicates with test verb layer 510, platform abstraction layer 530, graphical user interface object layer 540, and test tool primitives layer 550; accesses test data 514; and handles activity logging 570 and error handling and recovery 580. In some embodiments, platform abstraction layer 530 communicates with task layer 520 and graphical user interface object layer 540 and handles activity logging 570 and error handling and recovery 580. In another embodiment, graphical user interface object layer 540 communicates with task layer 520, platform abstraction layer 530, and test tool primitives layer 550 and handles activity logging 570 and error handling and recovery 580.

Figure 8:
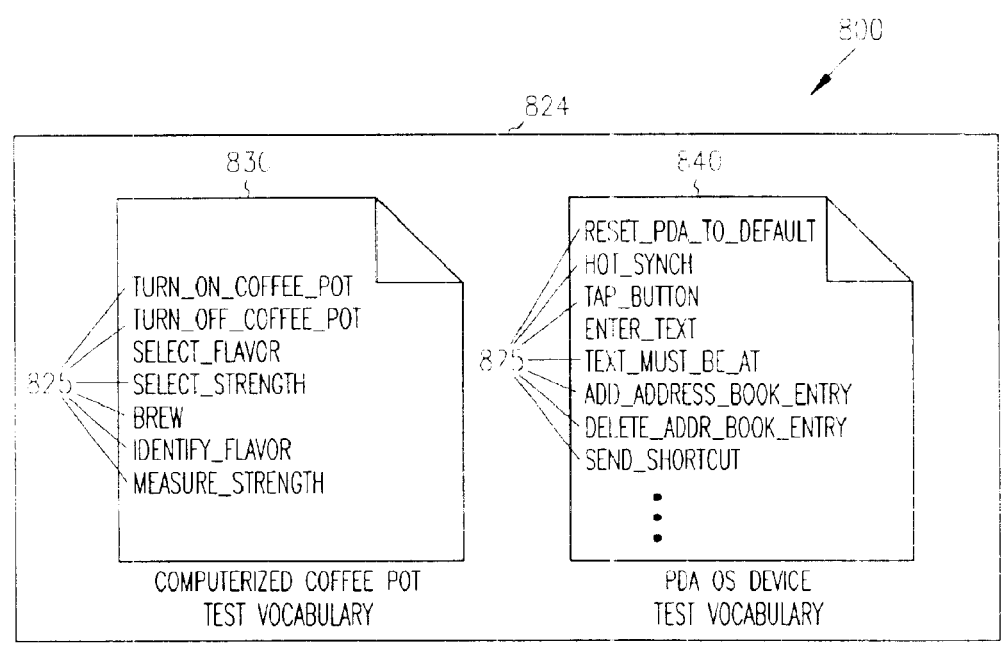
FIG. 8 shows example test vocabularies.

In some embodiments, test verbs are defined by abstracting the function to be tested to a system level, rather than a hardware level, to ensure the reusability of test verbs across platforms. In one such embodiment for a computerized coffee pot, as shown in FIG. 8, the test vocabulary for a computerized coffee pot 830 is valid regardless of whether the coffee pot on/off switch is a touch panel interface or an electro-mechanical switch. In this embodiment, all of the test verb definitions 825 for testing a computerized coffee pot are created at a level that allows for a test program using these test verbs 825 to be reused from one type of coffee pot to the next. In such an embodiment, the hardware specifics for test verbs are handled in the platform abstraction and graphical user interface object layers. Both example test vocabularies shown in FIG. 8 are oriented to the operations performed not the hardware specifics of the platform. In these embodiments, the flexible, layered architecture shown in FIG. 5, and described above, allows this platform independence.

Wireless Test Verb Architecture

1 Overview

The following exemplary architecture provides a list of some test verbs embodiments for a generic phone implementation of test verb technology (TVT) along with providing possible parameter information and usage explanations for the test verbs.

2 Abbreviations Acronyms & Definitions

| | |
|---|---|
| ATS | Automated Test Solution |
| ATC | Automated Test Case (the script that automates the test case) |
| GUI | Graphical User Interface |
| TQPro | TestQuest Pro system |
| TED | Test Execution Driver |
| Test Case | The basic test unit that reports a pass/fail status |
| Test Verb | ATC statements that implement common testing activities. |
| TV | Test Verb |

-continued

| | |
|---|---|
| Test Session | The running of a sequence of ATC's |
| SUT | System Under Test |

3 Test Verbs High-Level Specification

The table below shows the test verb embodiments that are described herein. This is intended to be an illustrative list of some embodiments of wireless test verb technology. This is not intended to be an exhaustive list of embodiments. Many other embodiments will be apparent to those of skill in the art upon reviewing the information disclosed herein.

The various TV are categorized as to usage. Parameterization, implementation details and general design guidelines for each TV are treated in later sections

| TV List | Parameters |
|---|---|
| GENERIC TEST VERBS | |
| FOR_EACH | prt, arr |
| FOR_EACH_IF | ptr, arr, expr |
| REMARK | sz |
| SKIP_TESTCASE | sz |
| KNOWN_TO_FAIL | sz |
| KNOWN_TO_FAIL_BUG | sz |
| DELAY | time |
| NOT | (another TV) |
| NAVIGATION TEST VERBS | |
| NAVIGATE_HOME | NULL |
| NAVIGATE_TO_SCREEN | sz |
| VERIFICATION TEST VERBS | |
| VERIFY_CHOICE_ITEMS | list |
| VERIFY_CHOICE_ITEMS_SELECTED | list |
| VERIFY_INCOMING_CALL | timeout |
| VERIFY_TEXT | sz |
| VERIFY_TEXT_SELECTED | sz |
| READ_TEXT | buf |
| VERIFY_OBJECT | sz |
| WAIT FOR TEST VERBS | |
| WAIT_FOR_TEXT | sz, timeout |
| WAIT_FOR_OBJECT | sz, timeout |
| CURSOR TEST VERBS | |
| CHECK_CURSOR_BLINK | x, y |
| CURSOR_MUST_NOT_EXIST | x, y |
| MENU ITEM SELECTION TEST VERBS | |
| SELECT_MENU_ITEM | sz |
| PHONE RELATED TEST VERBS | |
| SET_POWER | ival |
| POWER_CYCLE_PHONE | NULL |
| RESET_AUDIO | NULL |
| DISCONNECT_BATTERY | NULL |
| CONNECT_BATTERY | NULL |
| UNLOCK_PHONE | NULL |
| LOCK_PHONE | NULL |
| LOG_PHONE_CONFIGURATION | NULL |
| SET_OBJECT | Sz |
| KEY PRESS TEST VERBS | |
| DIAL_NUMBER | sz |
| SEND_STRING | sz |
| PRESS_KEYS | sz |
| HOLD_KEY | sz |
| RELEASE_KEY | sz |

4 Test Verbs Detail

The table below shows some embodiments of the test verbs that are described herein. The various test verbs are categorized.

4.1 Generic Test Verbs

This category of TV's is generally associated with whatever implementation is undertaken. These TV's are more specific to testing than they are to a particular platform and are used to control, monitor, log and establish control of testing.

4.1.1 FOR_EACH(ptr, arr)

This test verb is a simplified loop iterator that works in conjunction with special data table format. The two parameters that are passed to this test verb have to following characteristics:

ptr—This variable is a pointer to the first record in the named static structure that is the second variable of this test verb.

arr—This variable is the name of the static structure.

In some embodiments, the general usage of this test verb within the script would be as shown below:

```
FOR_EACH(Record,DataTable)
{
    DoThis(Record->Object1);
    DoThat(Record->Object2);
    DoThis(OtherParameter);
}
```

This script usage would in general be supported by a static structure that was declared global to the ATC as follows:

```
static struct
{
    char * Object1;
    int Object2;
} *Record,DataTable[] = {
        { "One", 1 },
        { "Two", 2 },
        { "Three"3 }
};
```

4.1.2 FOR_EACH_IF(ptr, arr,expr)

This test verb is a slightly more complex loop iterator that works in conjunction with a special data table format, allowing for conditional execution of data table entries. The three parameters that are passed to this test verb have to following characteristics:

ptr—This variable is a pointer to the first record in the named static structure that is the second variable of this test verb.

arr—This variable is the name of the static structure.

expr—a condition that can be used for early termination of the for loop

In some embodiments, the general usage of this test verb within the script would be as shown below:

```
FOR_EACH_IF(Record,DataTable,(Record->Filter = = variable))
{
    DoThis(Record->Object1);
    DoThat(Record->Object2);
    Filter = DoThis(OtherParameter);
}
```

This script usage would in general be supported by a static structure that was declared global to the ATC as follows:

```
static struct
{
    char * Object1;
    int Object2;
    int Filter;
} *Record,DataTable[] = {
        { "One", 1, 4},
        { "Two", 2, 4},
        { "Two" 2, 8}
};
```

4.1.3 REMARK(sz)

This TV simply posts a comment to the log.

In some embodiments, the general usage of this test verb within the script would be as shown below:

REMARK("Specialized Test Case for SMS messaging")

4.1.4 SKIP_TESTCASE(sz)

This TV simply posts comments to the log.

In some embodiments, the general usage of this test verb within the script would be as shown below:

```
TEST_CASE_START("TC DataTable 14")
{
    SKIP_TESTCASE("The TC requires a BSE, will perform
    manually for now");
}
TEST_CASE_CLEANUP(iStatus)
```

4.1.5 KNOWN_TO_FAIL(sz)

This TV simply posts comments to the log and then skips the remainder of the code to go to the test case cleanup.

In some embodiments, the general usage of this test verb within the script would be as shown below: In general, if an ATC is authored, but the script does not yet run for some external reason (that is not a bug), this line can be placed in an appropriate place in the script to ensure the script does not continue to a failure and to continue to note in the log files an area that must be addressed prior to completion.

In general, the test engineer would author a complete script, execute the script one time and determine that there was a Bug in the software. At that point, the BUG TV would be inserted typically as the first line of code, to record the fact of the bug to the logfile and skip the remainder of the test. This line of code would be removed upon the bug being corrected so that the test script again executed. It is simply a short-term placeholder of sorts.

```
TEST_CASE_START("TC DataTable 14")
{
    KNOWN_TO_FAIL("BSE TV for invalid frequency not
    implemented yet.");
    "BUG - 1734 - End Call Softkey not visible during emergency
    call");
    MORE_TESTVERBS( );
    MORE_TESTVERBS( );
}
TEST_CASE_CLEANUP(iStatus);
```

4.1.6 KNOWN_TO_FAIL_BUG(sz)

This TV simply posts comments to the log and then skips the remainder of the code to go to the test case cleanup.

In some embodiments, the general usage of this test verb within the script would be as shown below: In general, the test engineer would author a complete script, execute the script one time and determine that there was a Bug in the software. At that point, the BUG TV would be inserted typically as the first line of code, to record the fact of the bug to the logfile and skip the remainder of the test. This line of code would be removed upon the bug being corrected so that the test script again executed. It is simply a short term placeholder of sorts.

```
TEST_CASE_START("TC DataTable 14")
{
    KNOWN_TO_FAIL_BUG(""BUG - 1734 - End Call Softkey
    not visible during emergency call");
    MORE_TESTVERBS( );
    MORE_TESTVERBS( );
}
TEST_CASE_CLEANUP(iStatus);
```

4.1.7 DELAY(time)

This TV simply waits the specified amount of time before releasing control to the next line of code.

The parameter that is passed to this TV has the following characteristics:

time—an integer string denoting the number of milliseconds to pause.

In some embodiments, the general usage of this test verb within the script would be as shown below:

PRESS_KEY("<Exit>");

DELAY(1000);

VERIFY_TEXT ("Menu", STANDARD);

4.1.8 NOT(another TV)

This TV performs the converse of another TV and takes care of correct logging and error handling. For example, if VERIFY_OBJECT("aHat") was used to verify that a bitmap depicting a hat was displayed on the screen, the command shown below would be used to verify that the bitmap was NOT present on the screen.

NOT(VERIFY_OBJECT("aHat"));

4.2 Navigation Test Verbs

This category of TV's is platform independent to the extent that it is typically used with a menued UI implementation. It is very platform dependent in it's implementation, as the characteristics of each platform are accessed by the TV's.

4.2.1 NAVIGATE_HOME(NULL)

This TV takes the steps necessary to return the device to its "home" or default screen. This is the screen from which all other navigation takes place. For the navigation in general, there will be a datatable maintained as one sheet of an Excel spreadsheet which will have a unique name for every screen that can be navigated to (including "home"), along with a title, tag or other unique identifier that can be used to verify navigation to that screen and the key sequence (from the home screen) that is required to navigate to that screen. This particular TV will lookup the screen name (likely "home") on the Excel spreadsheet and execute the associated key sequence and then verify that the navigation to the home screen was successful. For this particular TV, it is likely that the navigation is simply a sequence of END or CLEAR keys. This TV is typically implemented because it is quite frequently used. It could be replaced by the following TV (NAVIGATE_TO_SCREEN("Home")).

In some embodiments, the general usage of this test verb within the script would be as shown below:

DO_SOMETHING(sz);

VERIFY_SOMETHING(sz);

NAVIGATE_HOME( );

```
DO_SOMETHING_ELSE(sz);
NAVIGATE_TO_SCREEN("Names Add Number");
DO_SOMETHING(sz);
CHECK_SOMETHING(sz);
```
This TV is supported by an Excel spreadsheet table that would have the following general format:

| Screen | English | Spanish | Navigation |
|---|---|---|---|
| Home | Names | nombre | <End><End><Clear> |
| Names | Add | sumar | <Right><Down><Down><Down><Down> |
| Add Number | Number | numero | <Left> |

4.2.2 NAVIGATE_TO_SCREEN(sz)

This TV takes the steps necessary to navigate to the specified screen. A single parameter, which is the screen to which to navigate is passed to this routine. The first action taken within this TV will be to navigate to the Home screen, after which the navigation to the desired screen will take place. The associated Excel spreadsheet contains entries which specify all navigation from the "home" screen.

The parameter that is passed to this TV has the following characteristics:

sz—a string matching an entry in the navigation table (Excel spreadsheet) discussed in the previous section.

In some embodiments, the general usage of this test verb within the script is shown in the previous paragraph, along with the supporting spreadsheet example.

4.3 Verification Test Verbs

This category of TV's is used to perform verification activities on the device.

4.3.1 VERIFY_CHOICE_ITEMS(list)

This TV verifies that a list of choice items supplied by the call exists on the display. It will pass if the items are visible whether they are selected (reverse highlighted or color coded) or not selected. The TV will scroll as necessary to view the complete list. The choice items must be valid screen names from the datatable (Excel spreadsheet mentioned in the previous section).

```
char *aList[10] = {"Unmute",NULL};
VERIFY_CHOICE_ITEMS(aList);
```

In some embodiments, the general usage of this test verb within the script would be as shown below:

```
NAVIGATE_TO_SCREEN("Names Add Number");
VERIFY_CHOICE_ITEMS(aList);
```

This script usage would in general be supported by a character array declared within the script, an example of which would be:

```
char *aList[10] = {"General", "Mobile", "Home", "Work",
    "Fax", NULL};
```

4.3.2 VERIFY_CHOICE_ITEMS_SELECTED(list)

This TV verifies that a list of choice items supplied by the call exists on the display, and that the items are in the required order and selected (reverse highlighted or color coded) as the cursor passes over each item. The choice items must be valid screen names from the datatable (Excel spreadsheet mentioned in the previous section).

```
char *aList[10] = {"Unmute",NULL};
VERIFY_CHOICE_ITEMS(aList);
```

In some embodiments, the general usage of this test verb within the script would be as shown below:

```
NAVIGATE_TO_SCREEN("Names Add Number");
VERIFY_CHOICE_ITEMS(aList);
```

This script usage would in general be supported by a character array declared within the script, an example of which would be:

```
char *aList[10] = {"General", "Mobile", "Home", "Work",
    "Fax", NULL};
```

4.3.3 VERIFY_INCOMING_CALL(timeout)

This TV will continue to attempt to verify that an incoming call is detected until the specified timeout period is exceeded. Internal to this test verb, it may look for objects, look for text, check LED's or use whatever method a particular phone requires for verification of an incoming call.

timeout—An integer specifying the number of seconds to retry prior to erroring out.

In some embodiments, the general usage of this test verb within the script would be as shown below:

VERIFY_INCOMING_CALL(25);

4.3.4 VERIFY_TEXT(sz)

This TV verifies that the specified text in the fonts declared in the font tables appears on the display. The parameters passed to this TV has the following format:

sz—A string specifying the text string that should appear on the display

In some embodiments, the general usage of this test verb within the script would be as shown below:

VERIFY_TEXT("John Smith");
VERIFY_TEXT("123 Main Street");

The fonts that are searched for this test verb can be any of those specifically listed in the platform font table. The search region is the default search region set in the platform layer.

If a specific font or a specific search region must be verified, the _EXT TV must be developed as discussed in section 5.

4.3.5 VERIFY_TEXT_SELECTED(sz)

This TV verifies that the specified text. The parameter passed to this TV has the following format:

sz—A string specifying the text string that should appear on the display

This TV can be thought to be the opposite of the VERIFY_TEXT TV, as for monochrome screens, typically a single routine is used for this with the foreground and background just reversed. In other instances, the same TV code is used, with a simple if statement that switches the search flow based on foreground/background requirements.

The script usage and supporting data are the same as the previous TV.

4.3.6 READ_TEXT(buf)

This TV is typically only used in an _EXT format (as described below). It reads the screen for the data and returns that information found.

buf—a character buffer to which the return data should be written.

In some embodiments, the general usage of this test verb within the script would be as shown below:

NAVIGATE_TO_SCREEN("ESN");
  READ_TEXT(szText);
  //Attempt to modify ESN
  SEND_KEYS("<Delete><Clear>");
  PRESS_KEYS("1234");
  VERIFY_TEXT(szText);

The above usage shows a general read text, which could be used to cycle through the entire screen and a pattern of different fonts, which in many cases is not practical, thus the typical usage of this as a __EXT verb.

4.3.7 VERIFY_OBJECT(sz)

This TV verifies the characteristics associated with anything that can be deemed an object. Object types include Icons, Softkeys, Images, Tones, LED's, etc. The string that is passed to this routine contains a key that is used internal to the routine to determine the object type. This in turn leads to the area of the Excel spreadsheet that is used to gather the object characteristics relative to each object type verification.

sz—a string denoting object type and object name

In some embodiments, the general usage of this test verb within the script would be as shown below:

NAVIGATE_TO_SCREEN("ESN");
  VERIFY_OBJECT("IC_ConnectedIcon");
  VERIFY_OBJECT("SK_Menu");

This test verb would be supported for the above usage by two different sheets in the Excel file. One which contains the Icons and their associated properties and one the contains the SoftKeys and their associated properties. In the first case above, the lookup would be performed against the Icon sheet because of the "IC_" prefix in the second case, the lookup is against the SoftKey sheet ("SK_" prefix). The associated tables in Excel for each case would take a form such as follows;

| Icon Properties Data Sheet | | |
|---|---|---|
| ICON | Bitmap | Region |
| ConnectedIcon | ConnectedIcon.bmp | 0, 0, 100, 20 |

| SoftKey Properties Data Sheet | | | | |
|---|---|---|---|---|
| Key Name | Font | Foreground | Background | Reqion |
| Menu | Courier.fnt | Black | White | 0, 0, 20, 20 |

4.4 WaitFor Test Verbs

This category of is used to provide the capability to wait a specified amount of time for an event to occur and declare an error if the event does not occur in the specified timeframe.

4.4.1 WAIT_FOR_TEXT(sz timeout)

This TV has the identical form to VERIFY_TEXT, where the first parameter specifies the text. The difference is that instead of the immediate check performed by VERIFY_TEXT, this TV will continue to retry the verification activity until a specified timeout period is elapsed.

sz—A string specifying the text string that should appear on the display

Timeout—The time in seconds to continue to retry the verification activity before declaring an error.

In some embodiments, the general usage of this test verb within the script would be as shown below:

SET_POWER(ON);
  WAIT_FOR_TEXT("Searching for Service", 10);
  4.4.2 WAIT_FOR_OBJECT(sz, timeout)

This TV has the identical form to VERIFY_OBJECT, where the first parameter specifies the object. The difference is that instead of the immediate check performed by VERIFY_OBJECT, this TV will continue to retry the verification activity until a specified timeout period is elapsed.

sz—a string denoting object type and object name

Timeout—The time in seconds to continue to retry the verification activity before declaring an error.

In some embodiments, the general usage of this test verb within the script would be as shown below:

PRESS_KEY("<Talk>");
  WAIT_FOR_OJBECT("IC_Phone", 3);
  4.5 Cursor Test Verbs

This category of TV's is used to perform various operations with the cursor.

4.5.1 CHECK_CURSOR_BLINK(x,y)

This test verb verifies that the cursor is blinking at the specified location.

The location must be expressed in X and Y coordinates, and is typically found in the Excel Spreadsheet.

The parameters for the TV are as follows:

x—The x location to search for the cursor
y—The y location to search for the cursor In some embodiments, the general usage of this test verb within the script would be as shown below:

CHECK_CURSOR_BLINK(FirstLineStart);
  PRESS_KEY("<Down>");
  CHECK_CUROR_BLINK(SecondLineStart);
  CURSOR_MUST_NOT_EXIST(FirstLineStart);

Where FirstLineStart is an x, y pair that is retrieved from the Excel Spreadsheet.

4.5.2 CURSOR_MUST_NOT_EXIST(x,y)

This test verb verifies that the cursor does not exist at the specified location.

The location must be expressed in X and Y coordinates, and is typically found in the Excel Spreadsheet.

The parameters for the TV are as follows:

x—The x location to search for the cursor
y—The y location to search for the cursor In some embodiments, the general usage of this test verb within the script would be as shown in the above paragraph:

4.6 Menu Item Selection Test Verbs

This TV is used to perform menu selection.

4.6.1 SELECT_MENU_ITEM(sz)

This test verb selects a particular menu item.

The parameters for the TV are as follows:

sz—The string to select

In some embodiments, the general usage of this test verb within the script would be as shown below:

NAVIGATE_TO_SCREEN("Calls");
  SELECT_MENU_ITEM("Dialed");
  PRESS_KEY("<Select>");
  4.7 Phone Related Test Verbs This category of TV's is related to specific phone actions.

4.7.1 SET_POWER(ival)

This TV sets the power of the phone to a specified state.

The parameter for the TV is as follows:

ival—Either ON or OFF

In some embodiments, the general usage of this test verb within the script would be as shown below:

SET_POWER(ON);
WAIT_FOR_TEXT("Connected", STANDARD);

4.7.2 POWER_CYCLE_PHONE(NULL)

This TV powers off the phone and then powers on the phone.

In some embodiments, the general usage of this test verb within the script would be as shown below:

POWER_CYCLE_PHONE( );
WAIT_FOR_TEXT("Connected", STANDARD);

4.7.3 RESET_AUDIO(NULL)

This TV resets the audio detection circuitry of the test station (if so equipped). This TV is typically used in conjunction with a VERIFY_OBJECT call.

In some embodiments, the general usage of this test verb within the script would be as shown below:

RESET_AUDIO( );
DO_SOMETHING( );
VERIFY_OBJECT("AUDIO_RingToneOn");

4.7.4 DISCONNECT_BATTERY(NULL)

This TV disconnects the battery from the phone.

In some embodiments, the general usage of this test verb within the script would be as shown below:

SELECT_MENU_ITEM("Spanish",5);
DISCONNECT_BATTERY( );
CONNECT_BATTERY( );
SET_LANGUAGE("Spanish");
WAIT_FOR_TEXT("Connected", STANDARD);

In this case, Spanish is the language selected from a menu item selection. The battery is then disconnected and reconnected and it is then verified that the language selection remains Spanish. The SET_LANGUAGE TV is the key to the various routines that the lookup table in the Excel spreadsheet is to be used to find the translation of the "Connected" phrase in the Spanish language and that is the verification item.

4.7.5 CONNECT_BATTERY(NULL)

This TV reconnects the battery to the phone.

In some embodiments, the general usage of this test verb within the script would be as shown above:

4.7.6 UNLOCK_PHONE(NULL)

This TV unlocks the phone.

In some embodiments, the general usage of this test verb within the script would be as shown below:

LOCK_PHONE( );
SELECT MENU_ITEM("Dial);
WAIT_FOR_TEXT("Enter Lock Code", STANDARD);
UNLOCK_PHONE( );

4.7.7 LOCK_PHONE(NULL)

This TV unlocks the phone.

In some embodiments, the general usage of this test verb within the script would be as shown above:

4.7.8 LOG_PHONE_CONFIGURATION(NULL)

This TV logs various information about the phone, the TV is somewhat dependent on the particular phone that is used and what information is desired to be logged when this TV is selected. Typically the TV will navigate to various menus and read information from the screen such as the software version, browser version, ESN, etc.

In some embodiments, the general usage of this test verb within the script would be as shown below:

LOG_PHONE_CONFIGURATION( );

4.7.9 SET_OBJECT(sz)

This TV is used to act upon input objects with characteristics defined in the spreadsheet. Objects can include strings of text, numeric strings, discretes, audio, etc. The string passed to the TV indexes into a table in the spreadsheet which can contain a column or columns that are used internal to the implementation to determine the actions associated with the particular object.

In some embodiments, the general usage of this test verb within the script would be as shown below SET_OBJECT("AnswerCall");

In the case above, the actions necessary to answer a call on a particular phone (keypress, keypresses, touchpad, etc.) would be performed when this command is utilized.

Allowable Input Parameters for this TV are:

AnswerCall—Must perform actions necessary to answer a call to the mobile.
EndCall—Must perform the actions necessary to terminate a call to the mobile.

4.8 Key Press Test Verbs

This category of TV's is used to stimulate the keypad of the phone and input either text or numerics dependent on selection.

4.8.1 DIAL_NUMBER(sz)

This TV sends the specified numeric sequence to the phone, and hits the key necessary to "send" the numeric string to the network.

The parameter for the TV is as follows:

sz—String specifying the number to be sent to the phone
In some embodiments, the general usage of this test verb within the script would be as shown below:

DIAL_NUMBER("5551212");

4.8.2 SEND_STRING(sz)

This TV set the specified sequence of keys to the phone. The parameter for the TV is as follows:

sz—String specifying the keys to be sent
In some embodiments, the general usage of this test verb within the script would be as shown below:

SEND_STRING("Alpha123");

Within the TV, the determination is made of what keys to strike and how many times to strike the key to obtain the desired sequence, which can be alpha, or alpha and numeric. If the current screen is not a text entry screen, the multiple key strikes to obtain the specified alpha character could be represented as multiple instances of the same number. The TV contains the intelligence to wait the required time between keystrokes to ensure the proper string is obtained when on an alpha entry screen.

4.8.3 PRESS_KEYS(sz)

This TV will use the Excel Spreadsheet to perform a lookup of the specified key and press it. It is typically used to specify a named softkey for pressing via looking up what key activates that particular softkey, or to simply press a sequence of keys a single time.

The parameter for the TV is as follows:

sz—String specifying the key(s) to be pressed
In some embodiments, the general usage of this test verb within the script would be as shown below:

PRESS_KEYS("<Select>");
PRESS_KEYS("12345");

This TV in the first case above is supported by a sheet in the data file that specifies the associated key to press.

4.8.4 HOLD_KEY(sz)

This TV is used to press a specified key without releasing it.

The parameters for the TV are as follows:

sz—key to be pressed

In some embodiments, the general usage of this test verb within the script would be as shown below:

HOLD_KEY("1");
DELAY("5000");
RELEASE_KEY("1");

4.8.5 RELEASE_KEY(sz)

This TV is used to release a specified key=t.

The parameters for the TV are as follows:

sz—key to be pressed

In some embodiments, the general usage of this test verb within the script would be as shown above.

EXT Test Verbs

A certain category of test verbs is quite often required, that being an extended test verb and is denoted by a suffix of _EXT to one of the TV's defined in the previous section. The typical list of TV's that would have the EXT suffix would be as follows:

VERIFY_TEXT
VERIFY_TEXT_SELECTED
VERIFY_TEXT_DOES_NOT_EXIST
READ_TEXT
WAIT_FOR_TEXT

These TV's typically will get the _EXT suffix to specifically denote font and search region characteristics. One example (VERIFY_TEXT) will be shown below. The others follow the same format.

VERIFY_TEXT_EXT(sz, font, region)

This TV verifies that the specified text in the specified font in the specified region appears on the screen. The parameters passed to this TV has the following format:

sz—A string specifying the text string that should appear on the display font—a font, either defined or specified a particular search region, often contained in the data table In some embodiments, the general usage of this test verb within the script would be as shown below:

VERIFY_TEXT_EXT("John Smith", LARGE_FONT, NAME_REGION);

CONCLUSION

As shown in FIG. 2, one aspect of the present invention provides a computerized method 200 for testing, from a host computer, a function of a wireless information-processing device. Method 200 provides an architecture having a set of test commands 212, the test commands 212 including a set of one or more stimulation commands 232 and a set of one or more result-testing commands 234 and defining a set of wireless test verbs from combinations of the test commands 212. This allows the test programmer to define an overall test program 216 that uses the wireless test verbs 214 in writing a test program 216 that specifies an overall function that will extensively test a wireless information processing device-under-test 99. The method further includes executing 220 a program that includes a plurality of wireless test verb instructions 214 and outputting 250 a result of the program 216. The method 200, further includes executing one or more test programs 216 on the host test computer.

In some embodiments, the wireless information processing device tested by an executing method 200 is a wireless telephone. In some other embodiments, the wireless information processing device tested by an executing method 200 is a personal data assistant (PDA).

In various embodiments, the stimulating 232 of method 200 includes a dialing test for performance on a wireless telephone when the method 200 is executed. In some embodiments, the receiving of a method 200 embodiment includes receiving a ringing signal.

In some embodiments of method 200, the test verbs 214 include test verbs 214 for stimulating 232 a wireless personal data assistant (PDA). In some other embodiments of method 200, the test verbs 214 include test verbs 214 for stimulating 232 a wireless phone.

In some embodiments, the method 200 further includes connecting the wireless information-processing device to one or more networks. In various method 200 embodiments, the one or more networks the wireless information-processing device can be connected to include a local area network, a wide area network, the internet, a telephone network, and a peer-to-peer network.

In various embodiments of method 200, the test verbs 214 include test verbs 214 defined to perform tasks that include looping, looping until certain criteria is met, posting remarks to an execution log, skipping steps in a test sequence in various ways, pausing test program or session execution for a specified period of time, and testing for an inverse result another test verb is intended to test for (see "NOT" test verb described above).

Other aspects of some embodiments of the method 200 include test verbs 214 for navigating through a graphical user interface of a wireless information-processing device, verifying the existence of specified items in a displayed list, verifying the existence and order of specified items in a displayed list, waiting for and verifying an incoming telephone call, and verifying that specified text is displayed and in the proper font. Some other embodiments of the method 200 include test verbs 214 for verifying that specified text is selected, reading displayed text, verifying the characteristics associated with a displayed object, waiting for certain events to occur, waiting for a specified event to occur, checking if a cursor is blinking, and checking if a cursor exists. Further, some embodiments of a method 200 include test verbs 214 for determining the existence of static, blinking, and moving pixel patterns.

Some method 200 embodiments include test verbs 214 for selecting menu items, setting power options, cycling power settings, manipulating audio options, connecting and disconnecting a power source, locking and unlocking a device, logging configuration settings, and acting upon input objects. In some further embodiments, method 200 includes test verbs 214 for dialing phone numbers, entering text strings, simulating pressing of keys and buttons, simulating the holding of keys and buttons for a specified duration, simulating the release of keys and buttons In some embodiments, the method 200 also includes wireless test verbs 214 for causing numeric, alphanumeric, and iconic data to be entered into the wireless information-processing device includes simulating key-presses, spoken words, and handwriting strokes.

Another aspect of the present invention, shown in FIG. 1, provides a computer readable media 160 having a instructions coded thereon for causing a suitably configured information handling system 110 to perform tests on a wireless information-processing device 99.

Yet another aspect of the present invention, again shown in FIG. 1, provides a computerized system 110 for testing a function of an information-processing system 99. The system includes a memory 120, an automated test tool 126, a set of test commands 122 stored in the memory 120, wherein each one of the test commands 122 includes a set of one or more stimulation commands 127 and a set of one or more result-testing commands 128. The system also includes individual wireless test verb definitions 125 stored in the memory 120 that defines a set of wireless test verbs 124 out of combinations of the test commands 122. A programmer then generates a wireless test program 121 stored in the memory 120 that includes a plurality of wireless test verb instructions 125. The system also includes a comparator 123 that generates test results based on a comparison of test result signals to desired result values. The system also includes an output port 130 that drives stimulation signals 132 based on the execution of the test program 121, an input port 140 that receives result signals 142 based on behavior of a system-under-test 99, and an output device 199 that presents a result of the test program 121. The system also includes an output device 199 for presenting the test results of a test program 121.

In some embodiments, the computerized system 110 is configured for testing wireless information processing devices including wireless telephones and personal digital assistants (PDA).

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computerized method for testing, from a host computer, a function of a wireless information-processing device, the method comprising:
   providing an architecture having a set of test commands, the test commands including a set of one or more stimulation commands and a set of one or more result-testing commands;
   defining a set of wireless test verbs from combinations of the test commands;
   defining, on the host computer, a program that includes a plurality of wireless test verb instructions from the defined set of wireless test verbs; and
   executing, on the host test computer, the defined program, wherein the defined program performs:
      stimulating the wireless information-processing device;
      receiving a result from the wireless information-processing device;
      checking the received result against an expected result; and
      outputting, from the host computer, information representing a result of the program.

2. The method of claim 1, wherein the wireless information-processing device includes a wireless telephone and the stimulating includes a dialing test and the receiving includes receiving a ringing signal.

3. The method of claim 1, wherein the wireless information-processing device includes a wireless personal data assistant (PDA) and the stimulating includes stimulating PDA commands.

4. The method of claim 1, wherein the wireless information-processing device is wirelessly connected to one or more networks and the stimulating includes sending a network connectivity command for which a predefined response is expected.

5. The method of claim 4, further comprising:
   causing the wireless information-processing device to connect to a telephone network.

6. The method of claim 1, wherein the wireless test verbs include a wireless test verb for testing for the existence of a pixel pattern on a display of the wireless information-processing device.

7. The method of claim 6, wherein the test verb for testing for the existence of a pixel pattern includes checking for the existence of a blinking or moving pixel pattern.

8. The method of claim 1, wherein the wireless test verbs include a wireless test verb for manipulating a power on/off function of the wireless information-processing device.

9. The method of claim 1, wherein the wireless test verbs include a wireless test verb for connecting and disconnecting a power supply from the wireless information-processing device.

10. The method of claim 1, wherein the wireless test verbs include a wireless test verb for changing the wireless information-processing device to and from a locked mode.

11. The method of claim 1, wherein the wireless test verbs include a wireless test verb for causing one or more configuration settings of the wireless information-processing device to be written to a log.

12. The method of claim 1, wherein the wireless test verbs include a wireless test verb for causing numeric, alphanumeric, and iconic data to be entered into the wireless information-processing device.

13. The method of claim 12, wherein the wireless test verb for causing numeric, alphanumeric, and iconic data to be entered into the wireless information-processing device includes simulating key-presses.

14. The method of claim 12, wherein the wireless test verb for causing numeric, alphanumeric, and iconic data to be entered into the wireless information-processing device includes simulating handwriting strokes.

15. The method of claim 1, wherein the wireless test verbs include a wireless test verb for verifying incoming data, the verifying includes:
   ensuring proper device response to incoming data.

16. A computer readable media comprising instructions coded thereon that when executed on a suitably programmed computer executes the method of claim 1.

17. A computerized system for testing a function of a wireless information-processing device, the system comprising:
   a memory,
   a set of test commands stored in the memory, the test commands including a set of one or more stimulation commands and a set of one or more result-testing commands;
   a wireless test verb instruction set program stored in the memory that defines a set of wireless test verbs each including a combination of the test commands;
   a test program stored in the memory that includes a plurality of wireless test verb instructions;
   a test session that includes one or more test programs for execution in a defined sequence;
   an interface configured to communicate a stimulation signal to the wireless information-processing device;
   an interface configured to receive a stimulation result signal from the wireless information-processing device;
   a comparator that generates a test result from a comparison of the result signals to desired result values; and an output device that presents the test result of the test program.

18. The computerized system of claim 17, wherein the wireless information-processing device is a wireless telephone.

19. The computerized system of claim 17, wherein the wireless information-processing device includes a personal digital assistant (PDA).

20. The computerized system of claim 17, wherein the wireless information-processing device is capable of connecting to one or more networks.

21. The computerized system of claim 20, wherein one of the networks the wireless information-processing device is capable of connecting to is a telephone network.

22. The computerized system of claim 17, wherein the wireless test verbs include:
   a wireless test verb for verification of a pixel pattern displayed on a display of the wireless information-processing device, the wireless test verb being capable of locating pixel patterns that are static, blinking, or moving.

23. The computerized system of claim 17, wherein the wireless test verbs include a wireless test verb for manipulating a power on/off function of the wireless information-processing device.

24. The computerized system of claim 17, wherein the wireless test verbs include a wireless test verb for connecting and disconnecting a power supply from the wireless information-processing device.

25. The computerized system of claim 17, wherein the wireless test verbs include a wireless test verb for placing the wireless information-processing device in a lock mode.

26. The computerized system of claim 17, wherein the wireless test verbs include a wireless test verb for changing the wireless information-processing device to and from a locked mode.

27. The computerized system of claim 17, wherein the wireless test verbs include a wireless test verb for causing one or more configuration settings of the wireless information-processing device to be written to a log.

28. The computerized system of claim 17, wherein the wireless test verbs include a wireless test verb for causing numeric, alphanumeric, and iconic data to be entered into the wireless information-processing device.

29. The computerized system of claim 28, wherein the wireless test verb for causing numeric, alphanumeric, and iconic data to be entered into the wireless information-processing device includes simulating keypresses on a telephone keypad.

30. The computerized system of claim 28, wherein the wireless test verb for causing numeric, alphanumeric, and iconic data to be entered into the wireless information-processing device includes simulating handwriting strokes on a handwriting recognition device.

31. The computerized system of claim 17, wherein the wireless test verbs include a wireless test verb for verifying incoming data.

32. The computerized system of claim 31, wherein the wireless test verb for verifying incoming data includes verifying an incoming telephone call.

33. A computerized system for testing a function of a wireless information-processing device, the system comprising:
   a memory having stored therein a set of test commands, the test commands including a set of one or more wireless stimulation commands and a set of one or more wireless result-testing commands;
   means for defining a set of wireless test verbs, each wireless test verb defined by a combination of the test commands, and for executing a program that includes a plurality of wireless test verb instructions; and
   an output device that outputs a result of the program.

* * * * *